United States Patent
Gawor et al.

(10) Patent No.: US 7,930,356 B2
(45) Date of Patent: Apr. 19, 2011

(54) MANAGEMENT OF EMAIL THREADS

(75) Inventors: Jaroslaw Gawor, Apex, NC (US); Paul F. McMahan, Apex, NC (US); Lin Sun, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 155 days.

(21) Appl. No.: 12/121,633

(22) Filed: May 15, 2008

(65) Prior Publication Data

US 2009/0287780 A1    Nov. 19, 2009

(51) Int. Cl.
*G06F 15/16* (2006.01)
(52) U.S. Cl. ...................................... 709/206
(58) Field of Classification Search .................... 709/206
See application file for complete search history.

(56) References Cited

U.S. PATENT DOCUMENTS

| 2005/0160158 A1* | 7/2005 | Firebaugh et al. ............ 709/223 |
| 2005/0223058 A1* | 10/2005 | Buchheit et al. .............. 709/203 |
| 2009/0100009 A1* | 4/2009 | Karp .................................. 707/3 |

* cited by examiner

*Primary Examiner* — Kenny S Lin
*Assistant Examiner* — Farhad Ali
(74) *Attorney, Agent, or Firm* — Jeffrey T. Holman

(57) ABSTRACT

A method and system are provided for managing email threads. The method includes receiving a plurality of separate email threads. The method further includes generating associations between at least two email threads of the plurality of separate email threads. The method further includes displaying the associations of the at least two email threads. As a result, users can conveniently view the associated email threads and perform operations on particular email threads.

20 Claims, 4 Drawing Sheets

Initial Email "Project Release Final Discussion"
    Email Thread A
        Reply A1
            Reply A3
        Reply A2

Email Thread B
        Reply B1
            Reply B2
        Reply B3

Initial Email "Project Early Phase Planning Discussion"
    Email Thread C
        Reply C1
            Reply C3
        Reply C2

Email Thread D
        Reply D1
            Reply D2
        Reply D3

FIG. 3

Initial Email "Project Release Final Discussion"
    Email Thread A
        Reply A1
            Reply A2
                Reply AB4
        Reply A3

Email Thread B
        Reply B1
            Reply B2
                Reply AB4
        Reply B3

FIG. 4

MANAGEMENT OF EMAIL THREADS

BACKGROUND OF THE INVENTION

Email applications have become a dominant means of communication over the years. Email has been increasingly pervasive, and is commonly used among users within business. Email threads are used to help organize emails by relating an initial email to a series of reply emails resulting from the initial email. Email threads also provide context to a user by enabling the user to view the initial email and the subsequent chain of reply emails.

One problem with email thread is that oftentimes, there can be multiple email threads on a particular topic at different times or on different mailing lists. For example, a topic on how to get a simple Java Persistence Application Programming Interface (JPA) sample might be discussed in one month in one email thread but might again be discussed at a later month in a separate email thread. In another example, a sender might initiate two separate email threads on a particular topic at the same time, for example, where there is a vote email thread for project A 1.0 and a separate discussion email thread for project A 1.0. Two or more email threads such as these are often closely related but hard to locate without performing a search on a user's mailbox. Search can take a significant amount of time if a given user has a mailbox with many emails, especially when the user subscribes to one or more high-traffic mailing lists.

Another problem with email threads is that oftentimes a user might send an email with a discussion topic to a few recipients, and the user might later receive multiple open replies and some private replies. When the user replies, the user can reply only to one particular email thread with no indication of the user has also replied some other email threads that the user has received.

BRIEF SUMMARY OF THE INVENTION

A method and system are provided for managing email threads. The method includes receiving a plurality of separate email threads. The method further includes generating associations between at least two email threads of the plurality of separate email threads. The method further includes displaying the associations of the at least two email threads. As a result, users can conveniently view the associated email threads and perform operations on particular email threads.

BRIEF DESCRIPTION OF THE DRAWINGS

FIG. 3 is a diagram illustrating a thread view of associated email threads according to one exemplary embodiment.

FIG. 4 is a diagram illustrating a thread view of associated email threads according to one exemplary embodiment.

DETAILED DESCRIPTION OF THE INVENTION

The present invention relates to a method and system for managing email threads. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The exemplary embodiment of the present invention provides a method and system for managing email threads. The method includes receiving a plurality of separate email threads. Associations are generated between the separate email threads, where the email threads that share a common topic. For example, the email threads may discuss the same project. The email threads are associated by tagging each of the email threads with the same tag. The method further includes displaying emails from the associated email threads and publishing the associations to a plurality of users. As a result, users can conveniently view the associated email threads and perform operations on particular email threads (e.g., delete, move, etc.).

Although the present invention disclosed herein is described in the context of email systems, the present invention may apply to other types of communication systems, and still remain within the spirit and scope of the present invention.

Figure 1:
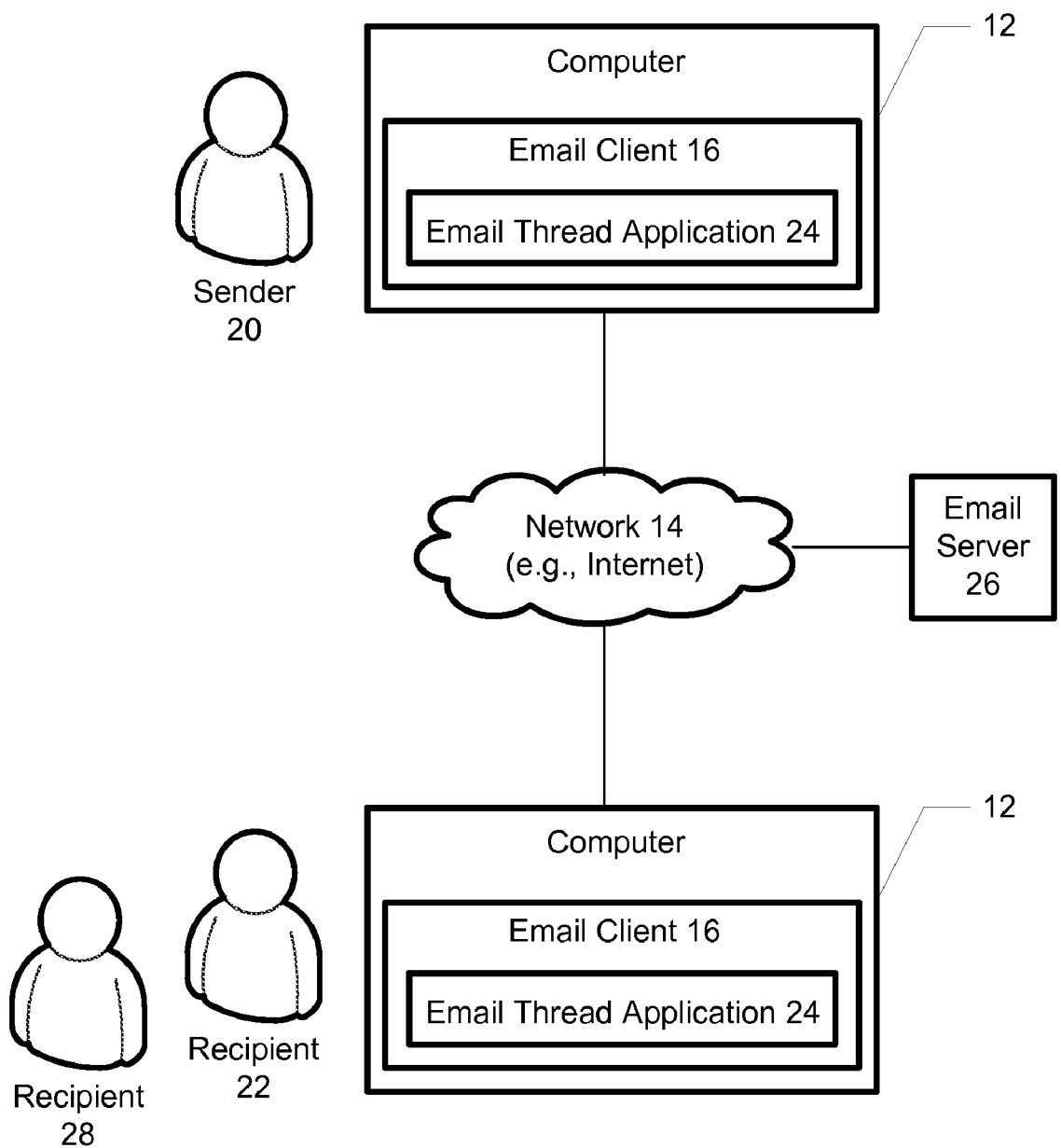
FIG. 1 is a logical block diagram illustrating an exemplary network system environment in which one embodiment of the present invention may be implemented for managing email threads.

FIG. 1 is a logical block diagram illustrating an exemplary network system environment in which one embodiment of the present invention may be implemented for managing email threads. A network system environment 10 is shown in which two or more computers 12 communicate over a network 14. The network 14 may be a public network, such as the Internet, or a private network, such as an intranet, LAN, or WLAN, or a combination of the above. At least a portion of the computers 12 may execute corresponding email clients 16, which operate with an email server 26 to provide email services to users. For example, the email clients 16 and email server 26 enable a given user (e.g., sender 20) to send emails to other users (e.g., recipients 22 and 28). Email clients 16 are also used to manage the emails exchanged between the users of networked computers 12. As described in more detail below, according to an exemplary embodiment, the email clients 16 may utilize an email thread application 24 to manage email threads.

Figure 2:
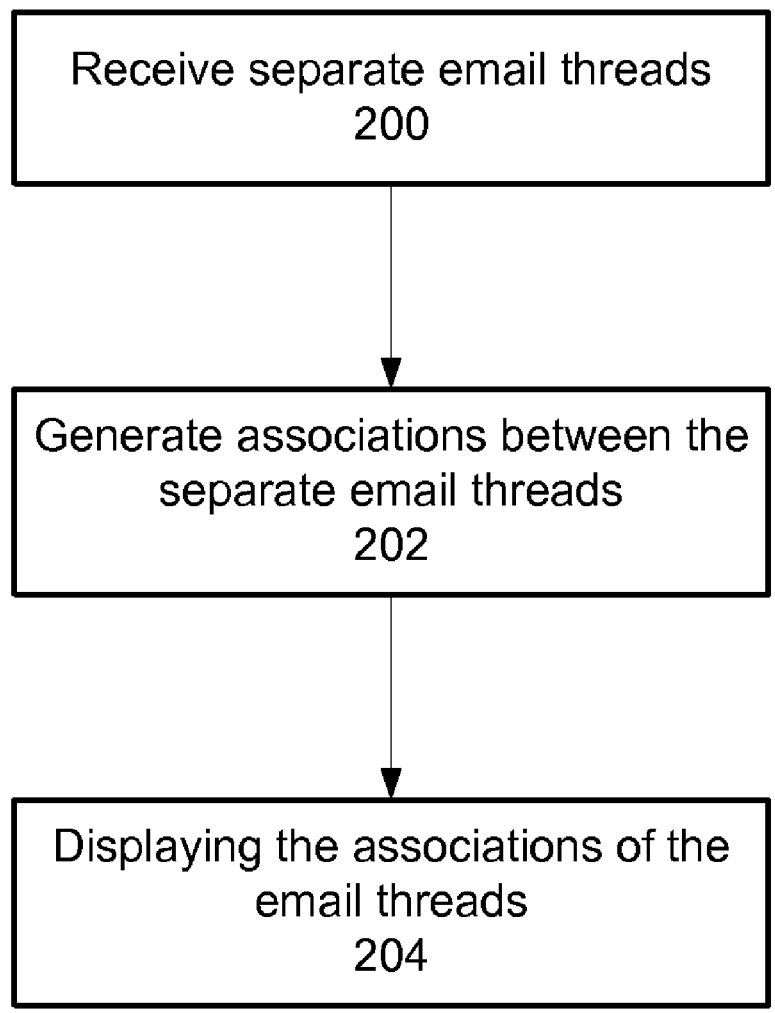
FIG. 2 is a diagram illustrating a process for managing email threads according to one exemplary embodiment.

FIG. 2 is a diagram illustrating a process for managing email threads according to one exemplary embodiment; and FIG. 3 is a diagram illustrating a thread view of associated email threads according to one exemplary embodiment. As described in more detail below, associated email threads are email threads that are associated by a given topic (e.g., the same subject or project, etc.). Referring to FIGS. 1-3, the process begins by the email thread application 24 receiving separate email threads (block 200). Each separate email thread may include one or more initial emails and one or more reply emails for each of the initial emails. For ease of illustration, an initial email may be defined as an initial email (i.e., non-reply email) that initiates a given email thread. For example, sender 20 may send an initial email (e.g., entitled "Project Release Final Discussion") to recipients 22 and 28. The sender 20 may send the initial email to each recipient 22 and 28 separately or to both together in an email distribution list. Recipients 22 and 28 may each reply to the initial email. If the initial email is sent to a distribution list, a given recipient may send the reply email only to the sender 20 using a simple reply command or may send the reply email to everyone using a "reply to all" command. The sender 20 may send another initial email (e.g., entitled "Project Early Phase Planning Discussion") to recipients 22 and 28.

In one embodiment, the separate email threads are generated from the initial emails. In one embodiment, separate email threads are separate in that they may involve different sets or combinations of users. For example, the email thread application 24 may generate an email thread A that is derived from the initial email entitled "Project Release Final Discussion" and which includes reply emails A1-A3 from one combination of users (e.g., the sender 20 and recipient 22). The email thread application 24 may also generate separate email thread B that is derived from the same initial email and which includes reply emails B1-B3 from a different combination of users (e.g., the sender 20 and recipient 28). Each of these email threads may also include reply emails from new recipients who subsequently join the discussion/email thread. Because these email threads are separate, not every user of these two email threads will receive both email threads. As described in more detail below, every user of these two email threads will receive both email threads after they are associated.

Similarly, the email thread application 24 may generate one or more other separate email threads from other initial emails. For example, the email thread application 24 may generate one or more email threads C and D that are derived from the initial email entitled "Project Early Phase Planning Discussion" and which include reply emails C1-C3 and D1-D3.

According to an exemplary embodiment, the email thread application 24 performs functions for generating associations between separate email threads (block 202). For example, in one embodiment, the email thread application 24 allows a user to manually select among existing email threads (or among emails within email threads) and manually tag the selected email threads and/or emails. For example, as the email thread application 24 displays email threads, the user may select one or more of the email threads or emails (e.g., using the mouse and pointer). The email thread application 24 may then display to the user a dialog box or window in which the user can enter text for a particular tag name or identification (e.g., "Project Release Final Discussion," or "Patent XYZ," etc.). The user may then accept the tag name (e.g., by selecting an "OK" or "Accept" button). Upon receiving the email thread selections and the tag name, the email thread application 24 then tags the selected email threads. In one embodiment, the user who tags a given email thread may be the originator of the email thread or a subsequent recipient of the email thread. In one embodiment, if the user later selects another separate email thread and tags the email thread the same tag name as an already existing group of associated email threads, that newly tagged email thread will then be associated with that already existing group. In one embodiment, if the user selects and tags a particular email, the thread application 24 may automatically tag any email thread that includes the email.

In one embodiment, the email thread application 24 may automatically determine what email threads are associated by their common tag. In one embodiment, when any new email thread that is not currently associated with a given email thread, yet which has or receives content (e.g., key words) that match the tag (e.g., "Patent XYZ"), the email thread application 24 may automatically associate the new email thread by tagging it with the same tag (e.g., "Patent XYZ"). As such, if a user views a given email thread, the user will view any newly associated email thread. In one embodiment, the email thread application 24 may automatically associate all email threads that are derived from the same initial email (e.g., associating email threads A and B).

In one embodiment, the email thread application 24 may associate separate email threads that are derived from different initial emails. Such separate email threads may be created by the same user at different times or created by different users. In one embodiment, the email thread application 24 associates different email threads based on their content being related to the same topic, same project, etc. For example, the email thread application 24 may associate the email threads A, B, C and D, where these email threads are related to the same project.

In one embodiment, a user may provide to the email thread application 24 a topic (e.g., invention disclosure XYZ). As such, the email thread application 24 uses the topic, which may be key words, as a tag in order to associate email threads having emails that contain the key words. In one embodiment, the email thread application 24 may identify the key words in the subject field of a given email or in other locations (e.g., in the body of the email).

In one embodiment, the email thread application 24 may generate a given association between the email threads after the email thread application 24 creates a second email thread and before a given sender sends the new email thread. Alternatively, the email thread application 24 may generate a given association between the email threads after the email thread application 24 creates the second email thread and after a given recipient receives the new email thread.

The email thread application 24 may then displays the associations of the associated email threads (204). As shown in FIG. 3, displaying the associations of the associated email threads enables the user to conveniently view all of the emails related to a given topic or project. As FIG. 3 shows, the emails (e.g., replies A1-A3) for a given thread (e.g., email thread A) are displayed as a group. Also, the email threads (e.g., email threads A and B) related to the same initial email (e.g., initial email "Project Release Final Discussion") are displayed as a group. Also, the emails of the associated email threads (e.g., emails A, B, C, and D) are displayed as a group.

The email thread application 24 may publish the generated associations to each of the email thread recipients, which may include the one or more users who initiated the associated email threads, original recipients of the initial email (e.g., subscribers on an email distribution list or otherwise), and new recipients who are subsequently copied or forwarded an email from one of the email threads. In one embodiment, the publication of the associations includes a reference to the associated emails and the common tag. In one embodiment, the reference and tag may be included in metadata that is associated with the email thread. In one embodiment, the tag may be visible to the user. In another embodiment, the tag may be hidden from the user.

In one embodiment, after the user tags a particular email thread, the user may then synchronize the user's local emails with the user's email stored at the email server. Also, the email thread application 24 may automatically synchronize the local emails with those stored at the email server when the user checks for new emails from the email server. In one embodiment, the email thread application 24 may store the association and tag with the email thread on the email server and also present the association and tag to other users (e.g., recipients of the associated email strings). When these users refresh their emails locally, their local email clients tag the same email threads with the same tag. As such, users will see the same tags and email thread associations as the users who created the associations. In one embodiment, a given user may modify or update the tags if desired. As such, the updated tags may be synchronized with the tags by the email clients of the other users.

In one embodiment, the publication of the associations for a given set of associated email threads may be granted to a select set of users. For example, instead sending the publication to all participates of the email threads, the email thread application 24 may send the publication only to users who are owners or contributors to a given project associated with the email threads.

As FIG. 3 shows, the email thread application 24 provides a thread view that displays in the same window the emails of a current email thread as well as emails of other associated threads. The association of the email threads and publication of the associations are beneficial in that the recipients of the email threads may view a given email (e.g., in a current email thread) and simultaneously locate and view all other emails in the same email thread or view all other emails in other associated email threads.

In one embodiment, the email thread application 24 enables a user to select particular email threads that have been associated (e.g., tagged) and then perform an operation on the non-selected email threads based on a command received from the user. For example, the email thread application 24 may enable the user to delete the emails of the non-selected email threads from a particular email folder, or move those emails to another email folder. Conversely, the email thread application 24 enables the user to select particular email threads that have been associated and then perform an operation on the selected email threads based on a command received from the user (e.g., delete or move all of the emails of the selected email threads).

FIG. 4 is a diagram illustrating a thread view of associated email threads according to one exemplary embodiment. In one embodiment, the email thread application 24 enables a user to select two or more emails from two or more associated email strings and reply to the selected emails simultaneously with the same reply email.

In one embodiment, one of the emails is the primary reply target, and one or more other emails may be reply targets from the same email thread as the primary reply target or from any other associated email threads different from that of the primary reply target. As such, the user can author a single reply email and send the same reply email to multiple reply targets simultaneously. For example, as FIG. 4 shows, a user can select reply targets (e.g., emails A2 and B2) and reply both of them at the same time with the same reply email AB4. After the reply email AB4 is sent, the email thread application 24 displays the reply email in all of the selected email threads A and B.

In one embodiment, if a user replies to a private email and to an email in an open discussion using the same reply email, the email thread application 24 displays a text box at the top of the reply email to the private email sender. The text box identifies the sender of that reply email and also indicates that that sender also replied (using the same reply email) to another email. In one embodiment, the email thread application 24 also identifies the other email being responded to (e.g., by title) and the sender of that email.

A system of method for managing email threads in an email system has been disclosed. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention has been described in accordance with the embodiments shown, and one of ordinary skill in the art will readily recognize that there could be variations to the embodiments, and any variations would be within the spirit scope of the present invention. Accordingly, many modifications may be made by one of ordinary skill in the art without departing from the spirit and scope of the appended claims.

We claim:

1. A method for managing email threads in an email system, the method comprising:
   receiving a plurality of separate email threads at an email client on a first computer;
   generating associations between at least two email threads of the plurality of separate email threads;
   facilitating display of the associations of the at least two email threads; and
   enabling a user to select a plurality of emails as current reply targets of a reply using a single reply email from the user.

2. The method of claim 1 wherein generating associations comprises:
   generating a tag; and
   tagging each of the at least two email threads with the tag.

3. The method of claim 1 further comprising publishing the associations to a plurality of users.

4. The method of claim 1 wherein, in relation to enabling the user to select the plurality of emails as current reply targets of the reply using the single reply email from the user, one of the emails is a primary reply target and at least one of the other emails are reply targets from the same email thread as the primary reply target.

5. The method of claim 1 wherein, in relation to enabling the user to select the plurality of emails as current reply targets of the reply using the single reply email from the user, one of the emails is a primary reply target and at least one of the other emails are reply targets from a different email thread from that of the primary reply target.

6. The method of claim 1 further comprising:
receiving from the user a selection of at least one email thread of the associated email threads;
receiving a command from the user; and
performing an operation on the emails of non-selected email threads based on the command.

7. The method of claim 1 further comprising:
receiving from the user a selection of at least one email thread of the associated email threads;
receiving a command from the user; and
performing an operation on the emails of the selected email threads based on the command.

8. An executable software product stored on a computer-readable storage device containing program instructions for managing email threads, the program instructions for:
receiving a plurality of separate email threads at an email client on a first computer;
generating associations between at least two email threads of the plurality of separate email threads;
facilitating display of the associations of the at least two email threads; and
enabling a user to select a plurality of emails as current reply targets of a reply using a single reply email from the user.

9. The executable software product of claim 8 wherein generating associations comprises:
generating a tag; and
tagging each of the at least two email threads with the tag.

10. The executable software product of claim 8 further comprising publishing the associations to a plurality of users.

11. The executable software product of claim 8 wherein, in relation to enabling the user to select the plurality of emails as current reply targets of the reply using the single reply email from the user, one of the emails is a primary reply target and at least one of the other emails are reply targets from the same email thread as the primary reply target.

12. The executable software product of claim 8 wherein, in relation to enabling the user to select the plurality of emails as current reply targets of the reply using the single reply email from the user, one of the emails is a primary reply target and at least one of the other emails are reply targets from a different email thread from that of the primary reply target.

13. The executable software product of claim 8 further comprising:
receiving from the user a selection of at least one email thread of the associated email threads;
receiving a command from the user; and
performing an operation on the emails of non-selected email threads based on the command.

14. The executable software product of claim 8 further comprising:
receiving from the user a selection of at least one email thread of the associated email threads;
receiving a command from the user; and
performing an operation on the emails of the selected email threads based on the command.

15. An email system comprising:
a first email client configured to execute on a first computer in communication with a server coupled to a network, wherein the first email client is configured to perform functions for:
receiving a plurality of separate email threads;
generating associations between at least two email threads of the plurality of separate email threads;
facilitating display of the associations of the at least two email threads; and
enabling a user to select a plurality of emails as current reply targets of a reply using a single reply email from the user.

16. The system of claim 15 wherein the first email client is further configured to perform functions for:
generating a tag; and
tagging each of the at least two email threads with the tag.

17. The system of claim 15 wherein the first email client is further configured to perform functions for publishing the associations to a plurality of users.

18. The system of claim 15 wherein one of the emails of the selected plurality of emails is a primary reply target, and at least one of the other emails of the selected plurality of emails are reply targets from the same email thread as the primary reply target.

19. The system of claim 15 wherein one of the emails of the selected plurality of emails is a primary reply target, and at least one of the other emails of the selected plurality of emails are reply targets from a different email thread from that of the primary reply target.

20. The system of claim 15 wherein the first email client is further configured to perform functions for:
receiving from the user a selection of at least one email thread of the associated email threads;
receiving a command from the user; and
performing an operation on the emails of non-selected email threads based on the command.

\* \* \* \* \*